United States Patent [19]

McDermott et al.

[11] Patent Number: 6,068,771
[45] Date of Patent: May 30, 2000

[54] METHOD FOR SEALING SPIRAL WOUND FILTRATION MODULES

[75] Inventors: Thomas McDermott, Wilmington; Martin Roos, Burlington; Stephen Jens, Winchester; Robert Kovar, Wrentham, all of Mass.

[73] Assignee: Koch Membrane Systems, Inc., Wilmington, Mass.

[21] Appl. No.: 09/248,422

[22] Filed: Feb. 11, 1999

[51] Int. Cl.[7] .......................... B01D 63/10; B32B 31/16
[52] U.S. Cl. ........................ 210/321.83; 55/520; 96/4; 156/74; 156/187; 156/285; 210/321.61; 210/321.85; 210/497.1
[58] Field of Search ................ 210/232, 321.61, 210/321.24, 321.76, 321.83, 321.85, 497.1; 156/74, 75, 184, 187, 188, 191, 195, 285; 55/520; 96/4, 11

[56] References Cited

U.S. PATENT DOCUMENTS

| | | |
|---|---|---|
| 3,042,571 | 7/1962 | Jackson . |
| 3,063,888 | 11/1962 | Howard et al. . |
| 3,306,794 | 2/1967 | Humbert, Jr. . |
| 3,367,504 | 2/1968 | Westmoreland . |
| 3,463,689 | 8/1969 | Palmai . |
| 3,668,837 | 6/1972 | Gross . |
| 3,734,989 | 5/1973 | Leonard et al. . |
| 3,813,334 | 5/1974 | Bray . |
| 3,827,562 | 8/1974 | Esmond . |
| 4,065,341 | 12/1977 | Cub . |
| 4,102,785 | 7/1978 | Head et al. . |
| 4,138,303 | 2/1979 | Taylor, Sr. . |
| 4,323,454 | 4/1982 | Fritzsche et al. . |
| 4,464,494 | 8/1984 | King et al. . |
| 4,475,973 | 10/1984 | Tanaka et al. . |
| 4,686,039 | 8/1987 | Otstot et al. . |
| 4,792,401 | 12/1988 | Truex et al. ................ 210/321.83 |
| 4,814,033 | 3/1989 | Spearman et al. . |
| 4,839,037 | 6/1989 | Bertelsen et al. . |
| 4,842,736 | 6/1989 | Bray et al. . |
| 4,844,805 | 7/1989 | Solomon . |
| 4,855,058 | 8/1989 | Holland et al. . |
| 4,879,032 | 11/1989 | Zemlin . |
| 4,902,417 | 2/1990 | Lien . |
| 4,904,327 | 2/1990 | Clark . |
| 4,906,371 | 3/1990 | Miller . |
| 4,906,372 | 3/1990 | Hopkins . |
| 4,929,351 | 5/1990 | Meyering et al. . |
| 4,983,423 | 1/1991 | Goldsmith . |
| 5,073,263 | 12/1991 | Fagundes et al. . |
| 5,114,582 | 5/1992 | Sandstrom et al. . |
| 5,137,637 | 8/1992 | Korin . |
| 5,147,541 | 9/1992 | McDermott, Jr. et al. . |
| 5,192,437 | 3/1993 | Chang et al. .................. 210/321.83 |
| 5,284,584 | 2/1994 | Huang et al. ..................... 156/187 |
| 5,304,312 | 4/1994 | Forster et al. . |
| 5,376,253 | 12/1994 | Rychen et al. . |
| 5,538,642 | 7/1996 | Solie . |
| 5,543,007 | 8/1996 | Takagaki et al. . |
| 5,605,628 | 2/1997 | Davidson et al. . |

FOREIGN PATENT DOCUMENTS

| | | |
|---|---|---|
| 251620 | 1/1988 | European Pat. Off. . |
| WO 93/1088 | 6/1993 | WIPO . |

*Primary Examiner*—Joseph W. Drodge

[57] ABSTRACT

A method for preparing a spiral wound filtration module is provided. The module has a central permeate carrier tube. The method includes winding at least one filtration leaf about the permeate carrier tube. The filtration leaf includes a first membrane sheet, a permeate carrier sheet, and a second membrane sheet. The winding step creates an end face extending radially outwardly from the permeate tube on each end thereof. After winding, the filtration module is maintained in a wound state. An adhesive is then supplied to each end face and a vacuum is applied through each of the permeate tube. While the vacuum is applied, the permeate tube and filtration leaf assembly are spun in a centrifuge until the adhesive has solidified. After spinning, each end face of the module is severed at a distance between the level of adhesive along the feed spacer screen and the level of adhesive along the permeate carrier sheet.

12 Claims, 3 Drawing Sheets

METHOD FOR SEALING SPIRAL WOUND FILTRATION MODULES

STATEMENT REGARDING FEDERALLY SPONSORED RESEARCH OR DEVELOPMENT

Not applicable.

CROSS REFERENCE TO RELATED APPLICATIONS

Not applicable.

BACKGROUND OF THE INVENTION

This invention relates generally to ultrafiltration technology, and more particularly to a method for sealing components of spiral wound filtration modules for use in cross-flow filtration.

The term "ultrafiltration" as used in the present application is intended to encompass microfiltration, nanofiltration, ultrafiltration, reverse osmosis and gas separation. A typical ultrafiltration device comprises a plurality of spiral wound filtration modules through which a fluid to be filtered passes.

Such a spiral wound filtration module consists of leaves in which a layer of a permeate carrier material, usually a porous felt or fabric material sold under the tradename TRICOT, is sandwiched between two membrane sheets. The membrane sheets comprise a membrane material integrally joined to a backing material. The membrane sheets are oriented relative to the permeate carrier material so that the membrane material is facing outwardly. The membrane sheets are typically folded once along their length to present a leaf with two halves integrally joined. The outside edges of the leaves are then sealed on all but one side, allowing access to the permeate carrier from a radial direction through the membrane. The membrane module is made by winding one or more membrane leaves around a permeate tube which has holes therein to collect the filtered product, or permeate. The membrane leaves are placed with the unsealed edge of each leaf adjacent to the permeate tube and oriented along the length of the permeate tube, allowing the permeate to flow into the permeate tube.

Each membrane leaf is separated from adjacent leaves by feed spacer screens, which are of a relatively large mesh size to accommodate feed fluid flow. The membrane leaves and feed spacer screens are spirally wound around the permeate tube. After the leaves are wound, some type of external restraining means such as a hard shell, straps or a bypass screen, or a combination thereof may be used to hold the spirally wound leaves in tight formation around the tube. The spiral module is then loaded into a pipe-like housing or pressure vessel which is operated at a slight pressure drop across the module as the fluid being filtered flows through.

In use, the product to be filtered is introduced under pressure at one end face of the module and is allowed to travel axially along the module through the feed spacer screens. Because the outside edges of the membrane leaves are sealed, the feed fluid is prevented from entering into the permeate carrier material without first passing through a membrane sheet. As the feed fluid flows axially through the module along the feed spacer screen, the permeate is allowed to pass through the membrane sheets and will be directed to the permeate carrier tube by the permeate carrier sheet. Concentrate is removed from one end of the module and permeate is removed through the permeate tube. This type of filtering, with a spiral wound module, is advantageous for a number of different applications. However, the manufacturing of these modules presents certain difficulties.

When winding a spiral wound filtration module, the layers of the leaves and feed spacer screens must be able to slide relative to one another, because the outside layers will be required to travel a greater distance than the inside layers due to the increasing circumferential distance. Therefore, it is now the practice of most manufacturers to use a wet adhesive, usually a two part epoxy or urethane, to seal the outer edges of the membrane leaves against one another, with the permeate carrier material sandwiched therebetween. This adhesive is either applied to the permeate carrier material or to the back sides of the membrane sheets, or both, as they are positioned one on top of the other. The spiral is then wound while the adhesive is wet, and the adhesive is allowed to cure after the spiral is wound. An additional bead of adhesive is applied across the bottom of each leaf axially along the module, from one side seam to the other. This axial bead can be applied either before or after winding the module.

Sealing the outer edges of a spiral wound module by application of a wet adhesive prior to winding presents many disadvantages. For example, the adhesive application process is now performed manually. As such, the process is labor intensive. This labor intensive process is compounded when a module having a large number of leaves is manufactured. Typically, a minimum of three and up to as many as twenty leaves are present in a spiral wound module.

Another disadvantage of the application of wet adhesive prior to winding is that the resulting seams between the membrane sheets and the permeate carrier material tend to be uneven due to a lack of automated adhesive application control. Uneven spreading of the glue, which takes place as the module is wound and tightened, further contributes to uneven seams. Uneven seams means that the seams are wider than necessary in some areas, which wastes potential active membrane area. In other words, any membrane area that is sealed beyond that necessary eliminates usable membrane surface area. Still further, the uneven seams make it difficult to clean the module to the level desired in sanitary applications. It is more difficult to properly clean a module having uneven and irregular seams than a module having consistent and straight seams.

Further, using the current wet adhesive method, care must be taken in winding to ensure that the adhesive is sheared so that the layers slide relative to one another. If such care is not taken, wrinkles may result in one or more of the materials, leading to a defective membrane module. It is difficult, however, to avoid wrinkling during wind up when using a wet adhesive due to the friction created by the uncured adhesive on the materials. Further, when winding a membrane module using a wet adhesive, the two outside edges of the layers must be tensioned uniformly to ensure that the same diameter is formed across the module, and to attempt to get the layers to lie flat so as to achieve a tight channel during winding. With the adhesive in place, using the current method, it is difficult to properly tension the materials and to get the many layers to lie flat so that a uniform, tight channel is produced during winding. This difficulty in applying uniform tension to the layers may result in modules with seams that have air voids or leaks, which require repair.

A further drawback in the use of the current wet adhesive method is that the adhesives used must have a viscosity high enough to resist running out of the relatively open crevices which are present near the edges of the membrane leaves. This high viscosity, however, makes it more difficult to achieve sufficient adhesive penetration into the fine openings in the backing of the membrane sheets. Without proper adhesive penetration, the seal between the membrane sheets and the permeate carrier can be defective. It is therefore difficult to balance the need for a high viscosity adhesive against the need for an adhesive which adequately penetrates into the backing of the membrane sheets to sufficiently hold the layers together.

Therefore, a device is needed which overcomes the drawbacks and deficiencies of the existing constructions and methods discussed above.

BRIEF SUMMARY OF THE INVENTION

Accordingly, it is an object of the present invention to provide an effective method of forming a spiral wound membrane module which eliminates or reduces the application of wet adhesives prior to winding.

Another object of the invention is to provide a method of forming a spiral wound membrane module that reduces the amount of labor required to manufacture the spiral wound module.

A further object of the invention is to provide a method of manufacturing a spiral wound filtration module that more consistently achieves a uniform outside diameter.

Another object of the invention is to provide a method of manufacturing a spiral wound filtration module that provides more even edge seams on the leaves of the module.

Yet another object of the invention is to provide an article of manufacture useful in forming a spiral wound module having more even edge seams and that reduces the application of wet adhesives prior to winding.

According to the present invention, a method for preparing a spiral wound filtration module utilizing a central permeate carrier tube includes winding at least one filtration leaf around the permeate carrier tube. The filtration leaf includes a first membrane sheet, a permeate carrier sheet, and a second membrane sheet with the backing side of each membrane sheet facing inward toward the permeate carrier sheet and the membrane separating surfaces facing outward. Each leaf is typically accompanied by a feed spacer sheet which is positioned adjacent to one of the outward facing surfaces of the membrane sheet such that the feed spacer sheet keeps neighboring membrane surfaces from contacting one another during and after winding.

The winding step creates an end face extending radially outward from the permeate tube on each end thereof. Prior to or at the completion of all or some part of the winding, a seam is formed at the bottom of each leaf axially along the module approximately from one end face to the other by the application of a bead of glue or through some other suitable means. The seam seals the bottom of the backing surfaces of the two membrane sheets along with the bottom of the permate carrier sheet that is positioned between them. After winding, the filtration module assembly is maintained in a wound state. The permeate tube and spiral wound module assembly are spun in a centrifuge. Prior to or as the module is spun, adhesive is introduced to one or both ends of the module. If adhesive is to be introduced to one end only, then the exposed permeate channel of the other end must be sealed off by some suitable means. Vacuum is then applied through at least one end of the permeate tube. The module is spun and vacuum is maintained until the adhesive has at least partially solidified. The application of the vacuum and the spinning act to draw the adhesive further along the permeate carrier sheet than along the feed spacer screen. After spinning, the affected end face or faces are severed at a distance between the level of the adhesive along the feed spacer sheet and the level of adhesive along the permeate carrier sheet.

The afore-described method achieves the objects heretofore set forth and others which are inherent from the description and claims which follow.

BRIEF DESCRIPTION OF THE SEVERAL VIEWS OF THE DRAWINGS

In the accompanying drawings which form a part of the specification.

DETAILED DESCRIPTION OF THE INVENTION

Figure 1:
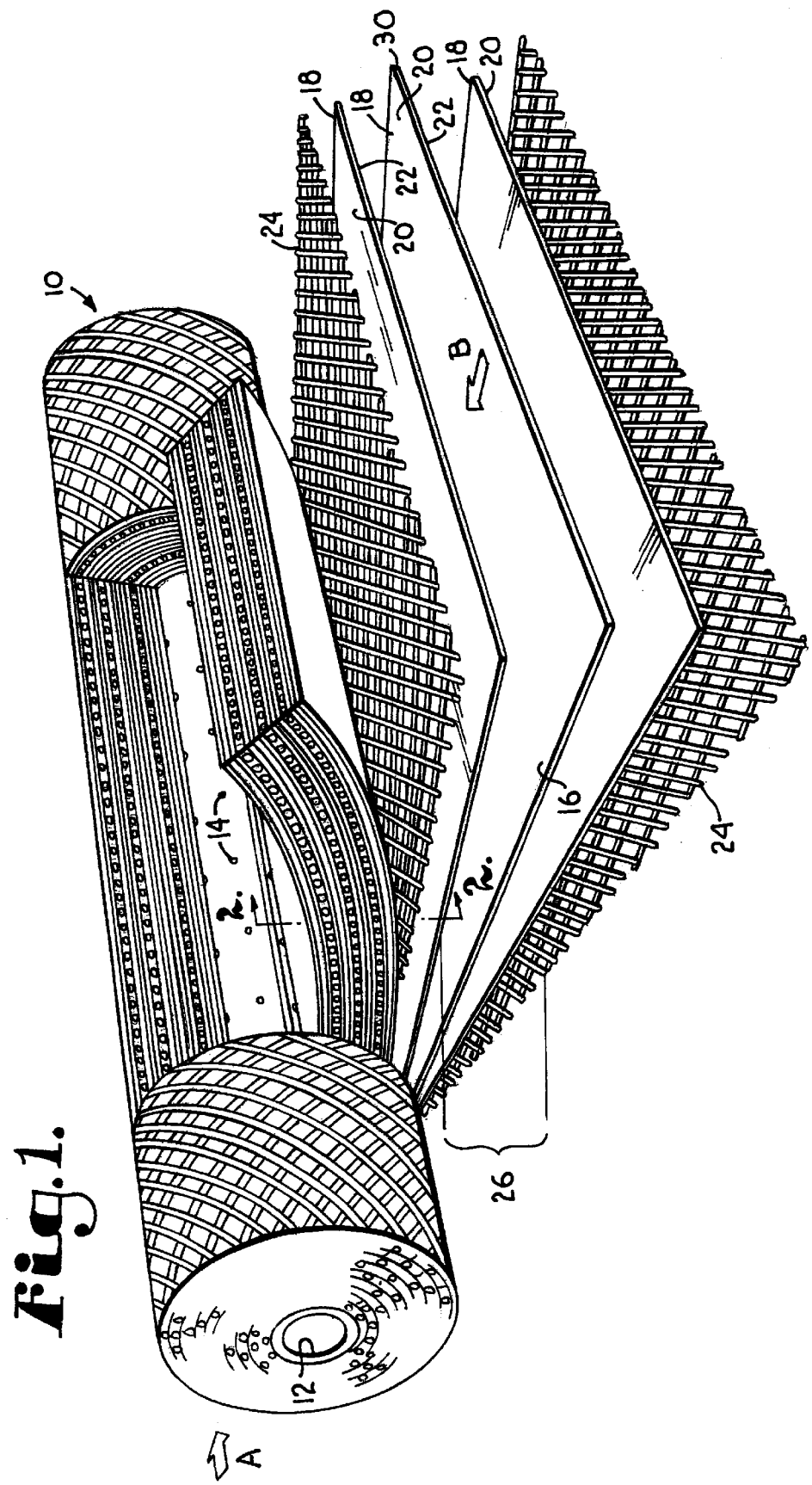
FIG. 1 is a partially exploded, perspective view of a filtration module embodying the principles of the present invention.

Referring initially to FIG. 1, a spiral wound filtration module manufactured according to the method of the present invention is designated generally by the numeral 10. The module 10 has at its center a permeate carrier tube 12 which has a plurality of openings 14 spaced about its perimeter. Openings 14 allow liquid communication between the exterior of tube 12 and the interior. Permeate tube 12 is constructed of a suitable rigid material, such as high strength inert plastic. Examples of suitable materials include polysulfone, polyvinylchloride and polyphenylene oxide. Other suitable materials which are rigid and which are compatible with the materials to be filtered are acceptable for use.

Surrounding permeate tube 12 and in liquid communication therewith is a permeate carrier material 16. Permeate carrier 16 acts to transport the filtered permeate in a direction perpendicular to the axial length of the tube, as indicated by the arrow B in FIG. 1. Suitable materials for permeate carrier 16 are well known in the art and include porous felts or fabric materials. For example, a material sold under the trade name TRICOT is a suitable material for permeate carrier 16.

Located on either side of permeate carrier 16 is a membrane sheet 18 which has a membrane surface 20 and a backing material 22. Membrane sheets 18 are oriented so that membrane surface 20 faces outwardly with respect to the permeate carrier 16. In other words, backing 22 faces permeate carrier 16. Membrane surface 20 and backing material 22 are integrally joined by techniques well known in the art to form membrane sheet 18. Acceptable materials for membrane 20 include a wide-range of thermoplastic resins which can be fabricated into a sheet having a known pore structure and filtration capability. A preferred material is polyethersulfone.

Materials acceptable for use as backing material 22 include woven or nonwoven synthetic materials having the strength necessary to reinforce membrane 20 and the ability to be integrally bound to the membrane while not interfering with the passage of permeate through the membrane. Suitable backing materials include polyester, polypropylene, polyethylene, and the family of polyamide polymers generally referred to as "nylon".

Disposed adjacent surface 20 of membrane sheet 18 is a feed spacer screen 24 which has a relatively large mesh size to allow the fluid to be filtered to travel axially along membrane module 10. In most instances, feed spacer 24 will be utilized, but it is possible and known in the art to construct a module without this component. In general, feed spacer 24 is formed of any inert material which maintains a space between the facing membrane surfaces 20. Further, the feed spacer screen 24 must allow the fluid to be filtered to travel axially along the membrane module. Preferred materials are adequately open, channel forming grid materials, such as polymeric grid, or corrugated or mesh materials. Preferred among these are polypropylene or other polyolefin netting materials, such as those commercially available from Nalle Plastics under the tradename VEXAR.

As known in the art, the edges of adjacent membrane sheets 18 which lie along the axial length of permeate tube 12 are sealed so that fluid flowing through feed spacer screen 24 is prevented from access to permeate tube 12. Alternatively, membrane sheet 18 may be folded with the fold being adjacent to the permeate tube 12 and with feed spacer screen 24 located within the fold such that membrane surfaces 20 face one another. In this construction, access to permeate tube 12 is allowed only through the permeate carrier material 16.

Permeate carrier 16, membrane sheets 18, and feed spacer screens 24 are thus spirally wound around permeate carrier tube 12 with permeate carrier 16 located adjacent tube 12 and in liquid communication therewith. Referring to the series of layers of feed spacer screen 24, membrane sheet 18, permeate carrier 16 and a second membrane sheet 18 as a filtration element 26, typically a plurality of filtration elements 26 are spirally wound about permeate tube 12. As is known in the art, filtration element 26 may optionally be formed without feed spacer screen 24.

After membrane module 10 has been wound, the assembly is held in a wound state through the use of restraining bands or outer wraps, or a combination thereof, as is known to those of skill in the art. The modules can then be loaded into a housing or pressure vessel which is operated at a slight pressure drop across the module as the fluid being filtered flows through. In operation, the fluid to be filtered is introduced at one end face of the membrane module 10, as indicated by the arrow A in FIG. 1. The fluid travels axially along membrane module 10 through feed spacer screen 24. As the feed fluid encounters surface 20 of sheet 18, permeate passes through membrane 18 in a direction perpendicular to the axis of tube 12. After the permeate passes through the membrane, it will travel along permeate carrier 16 in the direction of arrow B, eventually passing into permeate tube 12 through openings 14. The permeate exits the membrane module through tube 12 and the filtrate travels axially through the module along feed spacer screen 24.

As will be appreciated, it is necessary to seal all of the edges of membrane sheets 18 to the corresponding edges of permeate carrier 16, with the exception of the edge adjacent permeate tube 12, in order to prevent the feed fluid from entering the permeate carrier 16 without first passing through membrane sheet 18. This is necessary to prevent the feed fluid from entering permeate carrier 16 without first being filtered as desired. Prior art filtration modules have utilized a wet adhesive, which is typically a one-part or two-part epoxy or urethane to achieve this sealing. In the prior art, the wet adhesive is placed on the permeate carrier 16 and/or the backing material 22 prior to winding. The module is then wound while the adhesive is wet and held in place while the adhesive is allowed to cure. As discussed above, this prior art method presents a number of difficulties.

Figure 3:
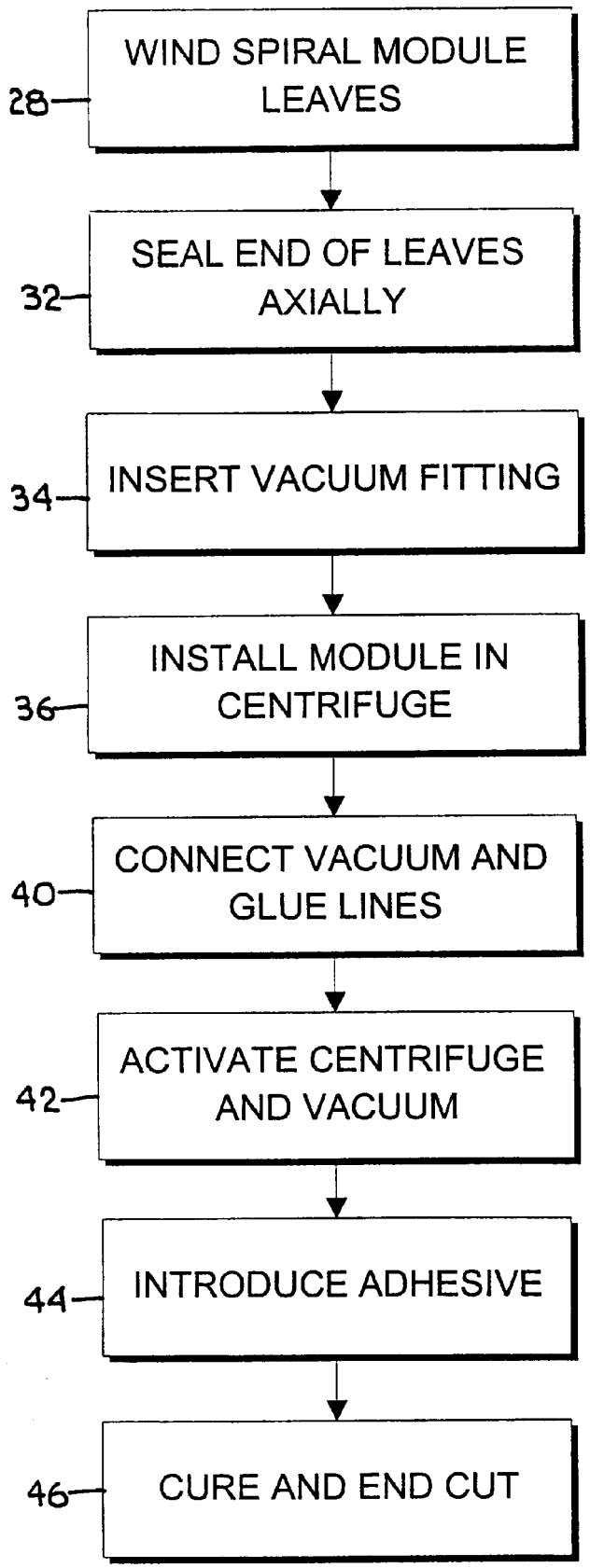
FIG. 3 is a schematic drawing illustrating the method of making a spiral wound module according to the present invention.

In the method of making the module according to the current invention, the membrane module is wound, with the elements in place as described above. During this winding, however, no adhesive is placed along the edges of membrane sheets 18 or permeate carrier 16. This initial dry winding is indicated in FIG. 3 at 28. In this method, as with previous methods, each filtration element 26 is coupled to permeate tube 12 with access allowed to tube 12 through permeate carrier 16. Either before or after all or some portion of winding, the longitudinal axial edge 30 is sealed with an adhesive or other suitable means, as indicated at 32 in FIG. 3, so that the axial seam between permeate carrier 16 and membrane sheets 18 is sealed.

If feed spacer 24 is not being used in module 10, it is necessary to space adjacent membrane sheets 18 to allow for adhesive penetration. Strips of feed spacer material 24 may be used for this purpose which do not extend axially all the way along the module.

After winding, an external restraining mechanism is applied to the module to prevent the module from unwinding. Thereafter, as indicated at 34, a vacuum fitting is placed in at least one end of permeate tube 12. If a vacuum fitting is placed in one end only, then the other end must be sealed with a plug. The vacuum fitting allows a vacuum to be pulled through tube 12 and through permeate carrier 16. The vacuum fitting is shaped to form an air-tight seal with permeate tube 12. An end cap is then placed over the end or ends of the module to which this method is to be applied. An opening in the end cap accommodates a connector which is in air tight communication with the vacuum fitting and is also connected to a vacuum pump. The end cap typically extends axially along module 10 a predetermined distance, preferably about two to three inches.

It is contemplated in the present invention that one end of the module can be sealed at a time, as well as sealing both ends simultaneously. If only one end is to be sealed, the open permeate channel exposed on the other end must be temporarily sealed off prior to the initiation of this process either mechanically or through the use of a removable sealant, such as a wax. This allows a vacuum to be applied to the end being permanently sealed.

After the end caps and vacuum fittings are in place, the entire assembly is placed in a centrifuge at station 36. The module is mounted within the centrifuge so that the axis of rotation of the centrifuge is aligned with the longitudinal center of the module. The axis of rotation for spinning the module is perpendicular to the longitudinal axis of permeate tube 12. As indicated at 40, each vacuum fitting is then connected to a vacuum source. Each end cap is then coupled to an adhesive reservoir.

Figure 2:
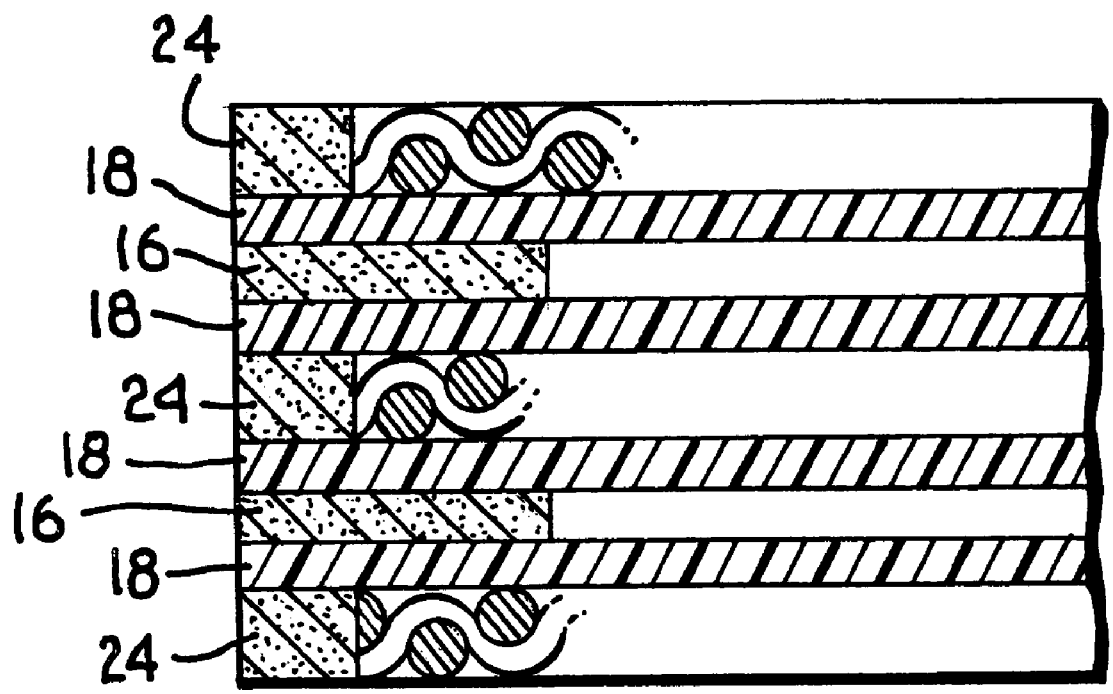
FIG. 2 is a partial, enlarged cross-sectional view taken along line 2—2 of FIG. 1.

Next, at station 42, the centrifuge is activated to spin the membrane module. The spinning operates to exert a centrifugal force radially outward away from the longitudinal mid-point of the membrane module. The rotational rate applied to the membrane module determines the force exerted. At station 44, adhesive is introduced into the end caps. A static head is established and maintained for the adhesive reservoir so as to fully wet the entire end face of the wound module without resulting in significant axial penetration of the adhesive into the module. The force applied by the centrifuge prevents the adhesive present at the end face of the module from being drawn into the feed channel along the feed spacer 24 by capillary action. As the centrifuge is spinning, the vacuum source is activated at station 42 to apply a vacuum to the permeate tube of module 10. This draws adhesive from the end cap or caps inwardly along the permeate carrier 16 between the membrane sheets 18. The rotational rate, and therefore the centrifugal force, and the vacuum are balanced against each other so that the adhesive is drawn into the module along the permeate carrier a predetermined distance. As seen in FIG. 2, the vacuum force draws the adhesive 48 further inwardly along the permeate carrier than along the feed spacer. A preferred distance for the travel of the adhesive along the permeate carrier is between two and three inches.

The centrifuge continues spinning the membrane module, and the vacuum is constantly applied until the adhesive has solidified. After the adhesive has sufficiently solidified, the spiral wound module is removed from the centrifuge. After the module is removed, the end caps and vacuum fittings are removed and the module is taken to a finishing station 46 where the terminal ends of the module are cut-off to open the feed channel. Before the ends are cut, the adhesive is blocking both the feed channel and the area between adjacent membrane sheets 18 along permeate carrier 16. In order to make the membrane module operable, the feed channel must be open so that fluid can travel axially along the module and through spacer 24 in the direction of arrow A in FIG. 1. Further, the membrane sheets 18 must remain secured to permeate carrier 16 so that feed fluid cannot enter the permeate carrier without first traveling through membrane sheets 18.

Through practice of the above method, the adhesive is drawn inwardly along permeate carrier 16 by the vacuum source a greater distance than the adhesive is allowed to travel along spacer 24, as seen in FIG. 2. By cutting off the ends of the ends of the module the feed channel is opened while the permeate carrier remains closed to the feed fluid. To accomplish this, the ends are cut at a point that is between the terminal edge 50 of the adhesive along the spacer and the terminal edge 52 of the adhesive along the permeate carrier.

As an example of the current method, a spiral having an outside diameter of four inches and a length of thirty-five and one-half inches can be manufactured. The spiral will have a length of approximately thirty-eight and one-half inches prior to cutting the ends. The spiral is placed in a centrifuge for spinning. The spiral is spun at a rate of 360 revolutions per minute, yielding a centrifugal force of about 66 g. A vacuum of 15 inches Mercury is applied during spinning. This vacuum draws the adhesive inwardly along the permeate carrier about two and one-half inches from the end of the module. The vacuum and centrifuge are applied for approximately one hour. However, the time needed varies depending on the adhesive being used. After spinning, each end face is trimmed at a point between the terminal edge of the adhesive along the permeate carrier and the terminal edge of the adhesive along the feed spacer.

The above method greatly reduces the amount of labor required in manufacturing a spiral wound membrane module. Further, the method reduces the need to apply a wet adhesive to the module leaves prior to winding, which allows modules to be more consistently produced having a uniform outside diameter. Still further, using the above method, the edge seams produced are more even that those typically produced using manually applied adhesives, resulting in less membrane void area.

From the foregoing, it will be seen that this invention is one well adapted to attain all of the ends and objects hereinabove set forth, together with other advantages which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus claimed the invention, what is claimed is:

1. A method of preparing a spiral wound filtration module from at least one filtration leaf comprising first and second membrane sheets having a permeate carrier sandwiched between the sheets, and a permeate carrier tube having openings along its length, said method comprising the steps of:

winding at least one of said leaves about said tube to present opposed spiral end faces which extend in a plane normal to the axis of said tube;

supplying liquid adhesive to at least one of said end faces;

applying a vacuum through said permeate carrier tube to draw said liquid adhesive in an axial direction away from said face; and subjecting said filtration leaf to centrifugal forces which act to resist movement of said liquid adhesive under the influence of said vacuum, whereby flow of said adhesive into said permeate carrier is controlled by balancing said centrifugal forces and the force applied through said vacuum.

2. The method as set forth in claim 1, wherein said filtration module includes at least two of said filtration leaves and a feed spacer screen between adjacent leaves for directing liquid to be filtered to said leaves, said balancing step allowing the flow of said adhesive axially into said permeate carrier a greater distance than the adhesive flow into said feed spacer screen.

3. The method of claim 2, wherein said applying step comprises applying a vacuum to both ends of said permeate carrier tube simultaneously.

4. The method of claim 3, wherein said step of subjecting said leaf to centrifugal forces is performed simultaneously with the step of applying said vacuum.

5. The method of claim 4, wherein the subjecting and applying steps are continued until said adhesive has at least partially solidified.

6. The method of claim 5, further comprising sealing the outside axial edge of each leaf of said filtration module before the subjecting step.

7. The method of claim 6, wherein said module is placed in a centrifuge to perform the subjecting step.

8. The method of claim 7, wherein the method further includes severing each end face after the adhesive has solidified at a location between the terminal edge of the adhesive along the feed spacer screen and the terminal edge of the adhesive along the permeate carrier.

9. The method of claim 8, wherein the permeate tube has a longitudinal axis and wherein the module is spun in the centrifuge about an axis that is perpendicular to the longitudinal axis of the permeate tube.

10. The method of claim 2, wherein said applying step comprises applying a vacuum to one end of said permeate carrier tube.

11. An article of manufacture useful in forming a spiral wound filtration module, said article comprising:

a permeate carrier tube having a plurality of openings along its length;

at least one filtration leaf having first and second membrane sheets and a permeate carrier sheet sandwiched between said sheets, said filtration leaf being wound about said permeate tube to present opposed spiral end faces which extend in a plane normal to the axis of said tube; and an adhesive disposed generally along each end face, said adhesive extending axially inwardly from each said end face a greater distance along said permeate carrier than along areas adjacent the membrane sheets.

12. The article of manufacture of claim 11, wherein said filtration module includes at least two of said filtration leaves and a feed spacer screen between adjacent leaves for directing liquid to be filtered to said leaves and wherein said adhesive extends axially inwardly from each said end face a greater distance along said permeate carrier than along said feed spacer screen.

* * * * *